US012271514B2

(12) United States Patent
Strawn et al.

(10) Patent No.: US 12,271,514 B2
(45) Date of Patent: Apr. 8, 2025

(54) MIXED REALITY INTERACTION WITH EYE-TRACKING TECHNIQUES

(71) Applicant: Meta Platforms Technologies, LLC, Menlo Park, CA (US)

(72) Inventors: Justin Strawn, San Francisco, CA (US); Nathan Aschenbach, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 144 days.

(21) Appl. No.: 18/100,707

(22) Filed: Jan. 24, 2023

(65) Prior Publication Data

US 2024/0248527 A1 Jul. 25, 2024

(51) Int. Cl.
*H04N 13/383* (2018.01)
*G02B 27/00* (2006.01)
*G02B 27/01* (2006.01)
*G06F 3/01* (2006.01)
*G06T 19/00* (2011.01)

(52) U.S. Cl.
CPC .......... *G06F 3/011* (2013.01); *G02B 27/0093* (2013.01); *G02B 27/0172* (2013.01); *G06T 19/006* (2013.01); *H04N 13/383* (2018.05)

(58) Field of Classification Search
CPC .......... G06F 3/011; G06F 3/017; G06F 3/013; G02B 27/0093; G02B 27/0172; G02B 2027/0141; G02B 2027/0138; G06T 19/006; H04N 13/383
See application file for complete search history.

(56) References Cited

U.S. PATENT DOCUMENTS

| | | | |
|---|---|---|---|
| 10,572,101 B2 | 2/2020 | Tomizuka et al. | |
| 11,393,174 B2 | 7/2022 | Fillhardt et al. | |
| 2014/0247232 A1* | 9/2014 | George-Svahn | G06F 3/012 345/184 |
| 2017/0085964 A1* | 3/2017 | Chen | H04N 21/433 |
| 2017/0266554 A1* | 9/2017 | Marks | A63F 13/5255 |
| 2018/0077345 A1* | 3/2018 | Yee | H04N 23/69 |
| 2019/0362557 A1 | 11/2019 | Lacey et al. | |
| 2020/0409481 A1* | 12/2020 | Henrikson | G06F 3/013 |
| 2021/0102820 A1 | 4/2021 | Le et al. | |

(Continued)

FOREIGN PATENT DOCUMENTS

EP 3187976 A2 7/2017

OTHER PUBLICATIONS

Carmichael R., "HoloLens and ArcGIS," YouTube, May 31, 2016, 1 page, Retrieved from the Internet: URL: https://www.youtube.com/watch?v=5OwyUVCPUQ4.

(Continued)

*Primary Examiner* — Jitesh Patel
(74) *Attorney, Agent, or Firm* — Mannava & Kang, P.C.

(57) ABSTRACT

Mixed reality (MR) user interactions are enabled through a combination of eye tracking (user gaze determination) and secondary inputs such as finger gestures, hand gestures, eye gestures, wrist band device input, handheld controller input, and similar ones. A location of interest in displayed content may be identified through the user's gaze, fixation, and/or saccades, or other actions, such as zoom, rotate, pan, move, open actionable menus, etc., may be performed on the location of interest based on the secondary inputs.

15 Claims, 11 Drawing Sheets

(56) References Cited

U.S. PATENT DOCUMENTS

2023/0069764 A1* 3/2023 Jonker ................ G06F 9/451
2023/0137219 A1* 5/2023 Kim ..................... H04N 7/157
                                                                                       348/43

OTHER PUBLICATIONS

Fracturereality, "Hololens—London City Skyline," YouTube, Oct. 17, 2016, 1 page, Retrieved from the Internet: URL: https://www.youtube.com/watch?v=KilkHpM_-b0.

Le H-Q., et al., "An Augmented Reality Application with Hand Gestures for Learning 3D Geometry," International Conference on Big Data and Smart Computing (BigComp), Feb. 13-16, 2017, pp. 34-41.

Logan T., "Accessible Maps on the Web," Equal Entry, May 21, 2018, 21 pages, Retrieved from the Internet: URL: https://equalentry.com/accessible-maps-on-the-web/.

Taqtile, "HoloMaps 3D Virtual Reality Map Viewer," YouTube, Aug. 6, 2020, 1 page, Retrieved from the Internet: URL: https://www.youtube.com/watch?v=NsQOxwouCvU.

European Search Report for European Patent Application No. 23212709.2, dated Apr. 19, 2024, 6 pages.

* cited by examiner

MIXED REALITY INTERACTION WITH EYE-TRACKING TECHNIQUES

TECHNICAL FIELD

This patent application relates generally to near-eye display devices, and in particular, to control of interaction with displayed content based on eye tracking in conjunction with other inputs.

BACKGROUND

With recent advances in technology, prevalence and proliferation of content creation and delivery has increased greatly in recent years. In particular, interactive content such as virtual reality (VR) content, augmented reality (AR) content, mixed reality (MR) content, and content within and associated with a real and/or virtual environment (e.g., a "metaverse") has become appealing to consumers.

To facilitate delivery of this and other related content, service providers have endeavored to provide various forms of wearable display systems. One such example may be a head-mounted display (HMD) device, such as a wearable eyewear, a wearable headset, or eyeglasses. In some examples, the head-mounted display (HMD) device may project or direct light to may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment. Head-mounted display (HMD) devices may also present interactive content, where a user's (wearer's) gaze may be used as input for the interactive content.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

DETAILED DESCRIPTION

Figure 1:
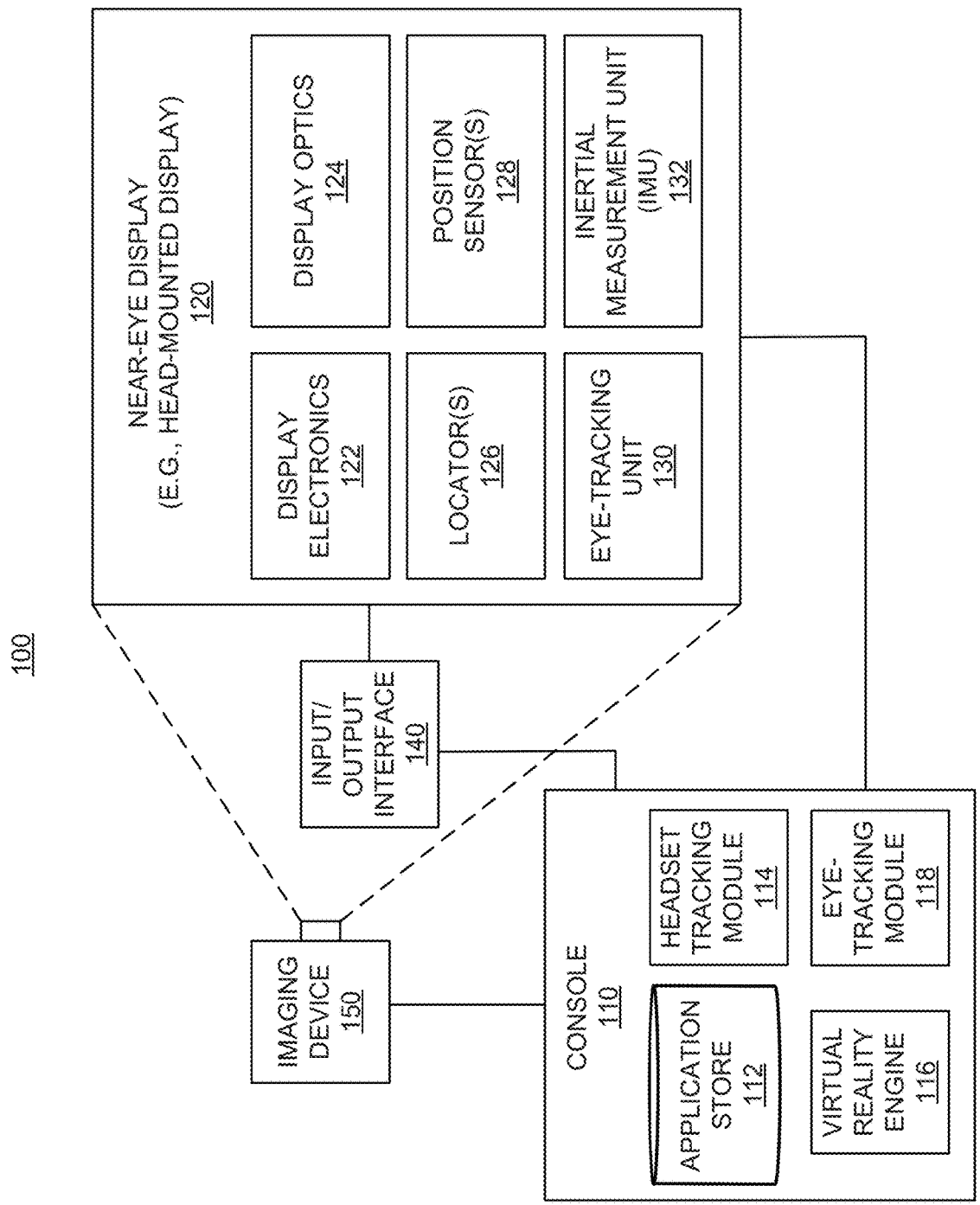
FIG. 1 illustrates a block diagram of an artificial reality system environment including a near-eye display, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill in the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

Tracking a position and orientation of the eye as well as gaze direction in head-mounted display (HMD) devices may unlock display and rendering architectures that can substantially alleviate the power and computational requirements to render 3D environments. Furthermore, eye-tracking enabled gaze prediction and intent inference can enable intuitive and immersive user experiences adaptive to the user requirements in his/her interaction with the virtual environment.

Eye tracking may be achieved via a number of techniques. Fringe projection, which projects a periodical pattern onto the eye and uses the reflected pattern to determine three-dimensional (3D) features, is one technique. Another technique utilizes time-of-flight analysis of light projected onto the eye. These and similar techniques involve projection of light, for example, laser light onto the eye and capture of the reflection from the eye at a near distance.

In some examples of the present disclosure, mixed reality (MR) user interactions may be enabled through a combination of eye tracking (user gaze determination) and secondary inputs such as finger gestures, hand gestures, eye gestures, body movements, wrist band device input, handheld controller input, and similar ones. A near-eye display device with eye tracking capability may display content generated or stored at the device or streamed to the device to a user. A location of interest (LOI) in displayed content may be identified through the user's gaze and/or fixation/saccades. The gaze based location of interest (LOI) identification may be considered a primary input. Actions such as zoom, rotate, pan, move, open actionable menus, select from presented options, etc. may be performed on the location of interest (LOI) based on the secondary inputs captured through an image sensor or other sensors on the near-eye display device or by other devices and communicated to a controller of the near-eye display device.

While some advantages and benefits of the present disclosure are apparent, other advantages and benefits may include enhanced functionality and accuracy for interaction with virtual reality content in near-eye display devices.

FIG. 1 illustrates a block diagram of an artificial reality system environment 100 including a near-eye display, according to an example. As used herein, a "near-eye display" may refer to a device (e.g., an optical device) that may be in close proximity to a user's eye. As used herein, "artificial reality" may refer to aspects of, among other things, a "metaverse" or an environment of real and virtual elements and may include use of technologies associated with virtual reality (VR), augmented reality (AR), and/or mixed reality (MR). As used herein a "user" may refer to a user or wearer of a "near-eye display."

As shown in FIG. 1, the artificial reality system environment 100 may include a near-eye display 120, an optional external imaging device 150, and an optional input/output interface 140, each of which may be coupled to a console 110. The console 110 may be optional in some instances as the functions of the console 110 may be integrated into the near-eye display 120. In some examples, the near-eye display 120 may be a head-mounted display (HMD) that presents content to a user.

In some instances, for a near-eye display system, it may generally be desirable to expand an eye box, reduce display haze, improve image quality (e.g., resolution and contrast), reduce physical size, increase power efficiency, and increase or expand field of view (FOV). As used herein, "field of view" (FOV) may refer to an angular range of an image as seen by a user, which is typically measured in degrees as observed by one eye (for a monocular head-mounted display (HMD)) or both eyes (for binocular head-mounted displays (HMDs)). Also, as used herein, an "eye box" may be a two-dimensional box that may be positioned in front of the user's eye from which a displayed image from an image source may be viewed.

In some examples, in a near-eye display system, light from a surrounding environment may traverse a "see-through" region of a waveguide display (e.g., a transparent substrate) to reach a user's eyes. For example, in a near-eye display system, light of projected images may be coupled into a transparent substrate of a waveguide, propagate within the waveguide, and be coupled or directed out of the waveguide at one or more locations to replicate exit pupils and expand the eye box.

In some examples, the near-eye display 120 may include one or more rigid bodies, which may be rigidly or non-rigidly coupled to each other. In some examples, a rigid coupling between rigid bodies may cause the coupled rigid bodies to act as a single rigid entity, while in other examples, a non-rigid coupling between rigid bodies may allow the rigid bodies to move relative to each other.

In some examples, the near-eye display 120 may be implemented in any suitable form-factor, including a head-mounted display (HMD), a pair of glasses, or other similar wearable eyewear or device. Examples of the near-eye display 120 are further described below with respect to FIGS. 2 and 3. Additionally, in some examples, the functionality described herein may be used in a head-mounted display (HMD) or headset that may combine images of an environment external to the near-eye display 120 and artificial reality content (e.g., computer-generated images). Therefore, in some examples, the near-eye display 120 may augment images of a physical, real-world environment external to the near-eye display 120 with generated and/or overlaid digital content (e.g., images, video, sound, etc.) to present an augmented reality to a user.

In some examples, the near-eye display 120 may include any number of display electronics 122, display optics 124, and an eye tracking unit 130. In some examples, the near-eye display 120 may also include one or more locators 126, one or more position sensors 128, and an inertial measurement unit (IMU) 132. In some examples, the near-eye display 120 may omit any of the eye tracking unit 130, the one or more locators 126, the one or more position sensors 128, and the inertial measurement unit (IMU) 132, or may include additional elements.

In some examples, the display electronics 122 may display or facilitate the display of images to the user according to data received from, for example, the optional console 110. In some examples, the display electronics 122 may include one or more display panels. In some examples, the display electronics 122 may include any number of pixels to emit light of a predominant color such as red, green, blue, white, or yellow. In some examples, the display electronics 122 may display a three-dimensional (3D) image, e.g., using stereoscopic effects produced by two-dimensional panels, to create a subjective perception of image depth.

In some examples, the near-eye display 120 may include a projector (not shown), which may form an image in angular domain for direct observation by a viewer's eye through a pupil. The projector may employ a controllable light source (e.g., a laser source) and a micro-electromechanical system (MEMS) beam scanner to create a light field from, for example, a collimated light beam. In some examples, the same projector or a different projector may be used to project a fringe pattern on the eye, which may be captured by a camera and analyzed (e.g., by the eye tracking unit 130) to determine a position of the eye (the pupil), a gaze, etc.

In some examples, the display optics 124 may display image content optically (e.g., using optical waveguides and/or couplers) or magnify image light received from the display electronics 122, correct optical errors associated with the image light, and/or present the corrected image light to a user of the near-eye display 120. In some examples, the display optics 124 may include a single optical element or any number of combinations of various optical elements as well as mechanical couplings to maintain relative spacing and orientation of the optical elements in the combination. In some examples, one or more optical elements in the display optics 124 may have an optical coating, such as an anti-reflective coating, a reflective coating, a filtering coating, and/or a combination of different optical coatings.

In some examples, the display optics 124 may also be designed to correct one or more types of optical errors, such as two-dimensional optical errors, three-dimensional optical errors, or any combination thereof. Examples of two-dimensional errors may include barrel distortion, pincushion distortion, longitudinal chromatic aberration, and/or transverse chromatic aberration. Examples of three-dimensional errors may include spherical aberration, chromatic aberration field curvature, and astigmatism.

In some examples, the one or more locators 126 may be objects located in specific positions relative to one another and relative to a reference point on the near-eye display 120. In some examples, the optional console 110 may identify the one or more locators 126 in images captured by the optional external imaging device 150 to determine the artificial reality headset's position, orientation, or both. The one or more locators 126 may each be a light-emitting diode (LED), a corner cube reflector, a reflective marker, a type of light source that contrasts with an environment in which the near-eye display 120 operates, or any combination thereof.

In some examples, the external imaging device 150 may include one or more cameras, one or more video cameras, any other device capable of capturing images including the one or more locators 126, or any combination thereof. The optional external imaging device 150 may be configured to detect light emitted or reflected from the one or more locators 126 in a field of view of the optional external imaging device 150.

In some examples, the one or more position sensors 128 may generate one or more measurement signals in response to motion of the near-eye display 120. Examples of the one or more position sensors 128 may include any number of accelerometers, gyroscopes, magnetometers, and/or other motion-detecting or error-correcting sensors, or any combination thereof.

In some examples, the inertial measurement unit (IMU) 132 may be an electronic device that generates fast calibration data based on measurement signals received from the one or more position sensors 128. The one or more position sensors 128 may be located external to the inertial measurement unit (IMU) 132, internal to the inertial measurement unit (IMU) 132, or any combination thereof. Based on the one or more measurement signals from the one or more position sensors 128, the inertial measurement unit (IMU) 132 may generate fast calibration data indicating an estimated position of the near-eye display 120 that may be relative to an initial position of the near-eye display 120. For example, the inertial measurement unit (IMU) 132 may integrate measurement signals received from accelerometers over time to estimate a velocity vector and integrate the velocity vector over time to determine an estimated position of a reference point on the near-eye display 120. Alternatively, the inertial measurement unit (IMU) 132 may provide the sampled measurement signals to the optional console 110, which may determine the fast calibration data.

The eye tracking unit 130 may include one or more eye tracking systems. As used herein, "eye tracking" may refer to determining an eye's position or relative position, including orientation, location, and/or gaze of a user's eye. In some examples, an eye tracking system may include an imaging system that captures one or more images of an eye and may optionally include a light emitter, which may generate light (e.g., a fringe pattern) that is directed to an eye such that light reflected by the eye may be captured by the imaging system (e.g., a camera). In other examples, the eye tracking unit 130 may capture reflected radio waves emitted by a miniature radar unit. These data associated with the eye may be used to determine or predict eye position, orientation, movement, location, and/or gaze.

In some examples, the near-eye display 120 may use the orientation of the eye to introduce depth cues (e.g., blur image outside of the user's main line of sight), collect heuristics on the user interaction in the virtual reality (VR) media (e.g., time spent on any particular subject, object, or frame as a function of exposed stimuli), some other functions that are based in part on the orientation of at least one of the user's eyes, or any combination thereof. In some examples, because the orientation may be determined for both eyes of the user, the eye tracking unit 130 may be able to determine where the user is looking or predict any user patterns, etc.

In some examples, the input/output interface 140 may be a device that allows a user to send action requests to the optional console 110. As used herein, an "action request" may be a request to perform a particular action. For example, an action request may be to start or to end an application or to perform a particular action within the application. The input/output interface 140 may include one or more input devices. Example input devices may include a keyboard, a mouse, a game controller, a glove, a button, a touch screen, or any other suitable device for receiving action requests and communicating the received action requests to the optional console 110. In some examples, an action request received by the input/output interface 140 may be communicated to the optional console 110, which may perform an action corresponding to the requested action.

In some examples, the optional console 110 may provide content to the near-eye display 120 for presentation to the user in accordance with information received from one or more of external imaging device 150, the near-eye display 120, and the input/output interface 140. For example, in the example shown in FIG. 1, the optional console 110 may include an application store 112, a headset tracking module 114, a virtual reality engine 116, and an eye tracking module 118. Some examples of the optional console 110 may include different or additional modules than those described in conjunction with FIG. 1. Functions further described below may be distributed among components of the optional console 110 in a different manner than is described here.

In some examples, the optional console 110 may include a processor and a non-transitory computer-readable storage medium storing instructions executable by the processor. The processor may include multiple processing units executing instructions in parallel. The non-transitory computer-readable storage medium may be any memory, such as a hard disk drive, a removable memory, or a solid-state drive (e.g., flash memory or dynamic random access memory (DRAM)). In some examples, the modules of the optional console 110 described in conjunction with FIG. 1 may be encoded as instructions in the non-transitory computer-readable storage medium that, when executed by the processor, cause the processor to perform the functions further described below. It should be appreciated that the optional console 110 may or may not be needed or the optional console 110 may be integrated with or separate from the near-eye display 120.

In some examples, the application store 112 may store one or more applications for execution by the optional console 110. An application may include a group of instructions that, when executed by a processor, generates content for presentation to the user. Examples of the applications may include gaming applications, conferencing applications, video playback application, or other suitable applications.

In some examples, the headset tracking module 114 may track movements of the near-eye display 120 using slow calibration information from the external imaging device 150. For example, the headset tracking module 114 may determine positions of a reference point of the near-eye display 120 using observed locators from the slow calibration information and a model of the near-eye display 120. Additionally, in some examples, the headset tracking module 114 may use portions of the fast calibration information, the slow calibration information, or any combination thereof, to predict a future location of the near-eye display 120. In some examples, the headset tracking module 114 may provide the estimated or predicted future position of the near-eye display 120 to the virtual reality engine 116.

In some examples, the virtual reality engine 116 may execute applications within the artificial reality system environment 100 and receive position information of the near-eye display 120, acceleration information of the near-eye display 120, velocity information of the near-eye display 120, predicted future positions of the near-eye display 120, or any combination thereof from the headset tracking module 114. In some examples, the virtual reality engine 116 may also receive estimated eye position and orientation information from the eye tracking module 118. Based on the received information, the virtual reality engine 116 may determine content to provide to the near-eye display 120 for presentation to the user.

In some examples, the eye tracking module 118, which may be implemented as a processor, may receive eye tracking data from the eye tracking unit 130 and determine the position of the user's eye based on the eye tracking data. In some examples, the position of the eye may include an eye's orientation, location, or both relative to the near-eye display 120 or any element thereof. So, in these examples, because the eye's axes of rotation change as a function of the eye's location in its socket, determining the eye's location in its socket may allow the eye tracking module 118 to more accurately determine the eye's orientation.

In some examples, a location of a projector of a display system may be adjusted to enable any number of design modifications. For example, in some instances, a projector may be located in front of a viewer's eye (i.e., "front-mounted" placement). In a front-mounted placement, in some examples, a projector of a display system may be located away from a user's eyes (i.e., "world-side"). In some examples, a head-mounted display (HMD) device may utilize a front-mounted placement to propagate light towards a user's eye(s) to project an image.

Figure 2:
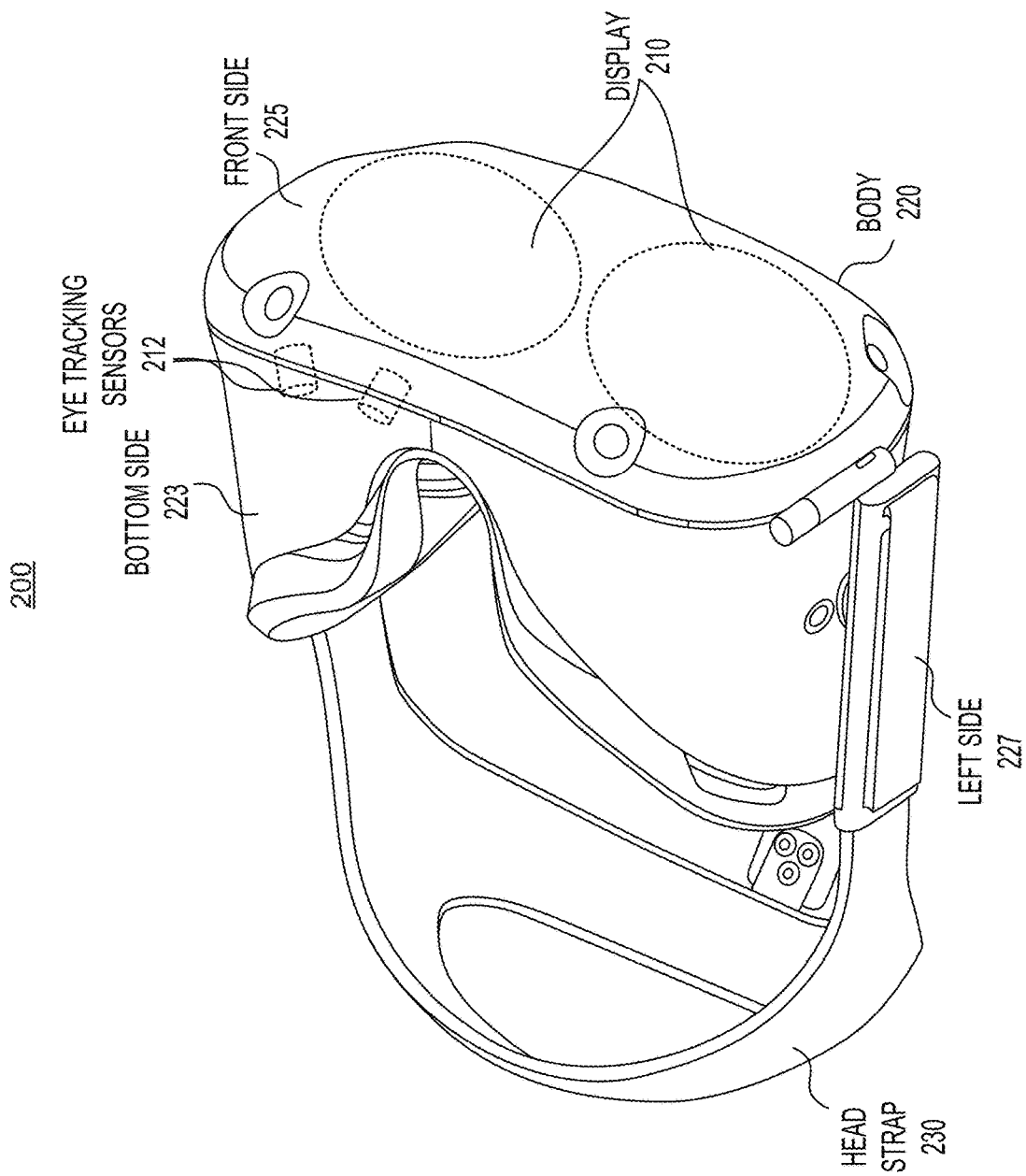
FIG. 2 illustrates a perspective view of a near-eye display in the form of a head-mounted display (HMD) device, according to an example.

FIG. 2 illustrates a perspective view of a near-eye display in the form of a head-mounted display (HMD) device 200, according to an example. In some examples, the head-mounted device (HMD) device 200 may be a part of a virtual reality (VR) system, an augmented reality (AR) system, a mixed reality (MR) system, another system that uses displays or wearables, or any combination thereof. In some examples, the head-mounted display (HMD) device 200 may include a body 220 and a head strap 230. FIG. 2 shows a bottom side 223, a front side 225, and a left side 227 of the body 220 in the perspective view. In some examples, the head strap 230 may have an adjustable or extendible length. In particular, in some examples, there may be a sufficient space between the body 220 and the head strap 230 of the head-mounted display (HMD) device 200 for allowing a user to mount the head-mounted display (HMD) device 200 onto the user's head. For example, the length of the head strap 230 may be adjustable to accommodate a range of user head sizes. In some examples, the head-mounted display (HMD) device 200 may include additional, fewer, and/or different components.

In some examples, the head-mounted display (HMD) device 200 may present, to a user, media or other digital content including virtual and/or augmented views of a physical, real-world environment with computer-generated elements. Examples of the media or digital content presented by the head-mounted display (HMD) device 200 may include images (e.g., two-dimensional (2D) or three-dimensional (3D) images), videos (e.g., 2D or 3D videos), audio, or any combination thereof. In some examples, the images and videos may be presented to each eye of a user by one or more display assemblies (not shown in FIG. 2) enclosed in the body 220 of the head-mounted display (HMD) device 200.

In some examples, the head-mounted display (HMD) device 200 may include various sensors (not shown), such as depth sensors, motion sensors, position sensors, and/or eye tracking sensors. Some of these sensors may use any number of structured or unstructured light patterns for sensing purposes. In some examples, the head-mounted display (HMD) device 200 may include an input/output interface 140 for communicating with a console 110, as described with respect to FIG. 1. In some examples, the head-mounted display (HMD) device 200 may include a virtual reality engine (not shown), but similar to the virtual reality engine 116 described with respect to FIG. 1, that may execute applications within the head-mounted display (HMD) device 200 and receive depth information, position information, acceleration information, velocity information, predicted future positions, or any combination thereof of the head-mounted display (HMD) device 200 from the various sensors.

In some examples, the information received by the virtual reality engine 116 may be used for producing a signal (e.g., display instructions) to the one or more display assemblies. In some examples, the head-mounted display (HMD) device 200 may include locators (not shown), but similar to the locators 126 described in FIG. 1, which may be located in fixed positions on the body 220 of the head-mounted display (HMD) device 200 relative to one another and relative to a reference point. Each of the locators may emit light that is detectable by an external imaging device. This may be useful for the purposes of head tracking or other movement/orientation. It should be appreciated that other elements or components may also be used in addition or in lieu of such locators.

It should be appreciated that in some examples, a projector mounted in a display system may be placed near and/or closer to a user's eye (i.e., "eye-side"). In some examples, and as discussed herein, a projector for a display system shaped liked eyeglasses may be mounted or positioned in a temple arm (i.e., a top far corner of a lens side) of the eyeglasses. It should be appreciated that, in some instances, utilizing a back-mounted projector placement may help to reduce size or bulkiness of any required housing required for a display system, which may also result in a significant improvement in user experience for a user.

In some examples, the projector may provide a structured light (fringe pattern) onto the eye which may be captured by the eye tracking sensors 212. The eye tracking sensors 212 or a communicatively coupled processor (e.g., eye tracking module 118 in FIG. 1) may analyze the captured reflection of the fringe pattern and analyze to generate a phase map of the fringe pattern, which may provide depth information for the eye and its structures. In other examples, a plurality of illuminators may provide glint illumination onto the eye for eye tracking. Glint based eye tracking may be enhanced in accuracy and range by using an array of light sources (illuminators) capable of providing polarization encoding and a polarization sensitive camera or array of detectors.

Figure 3A:
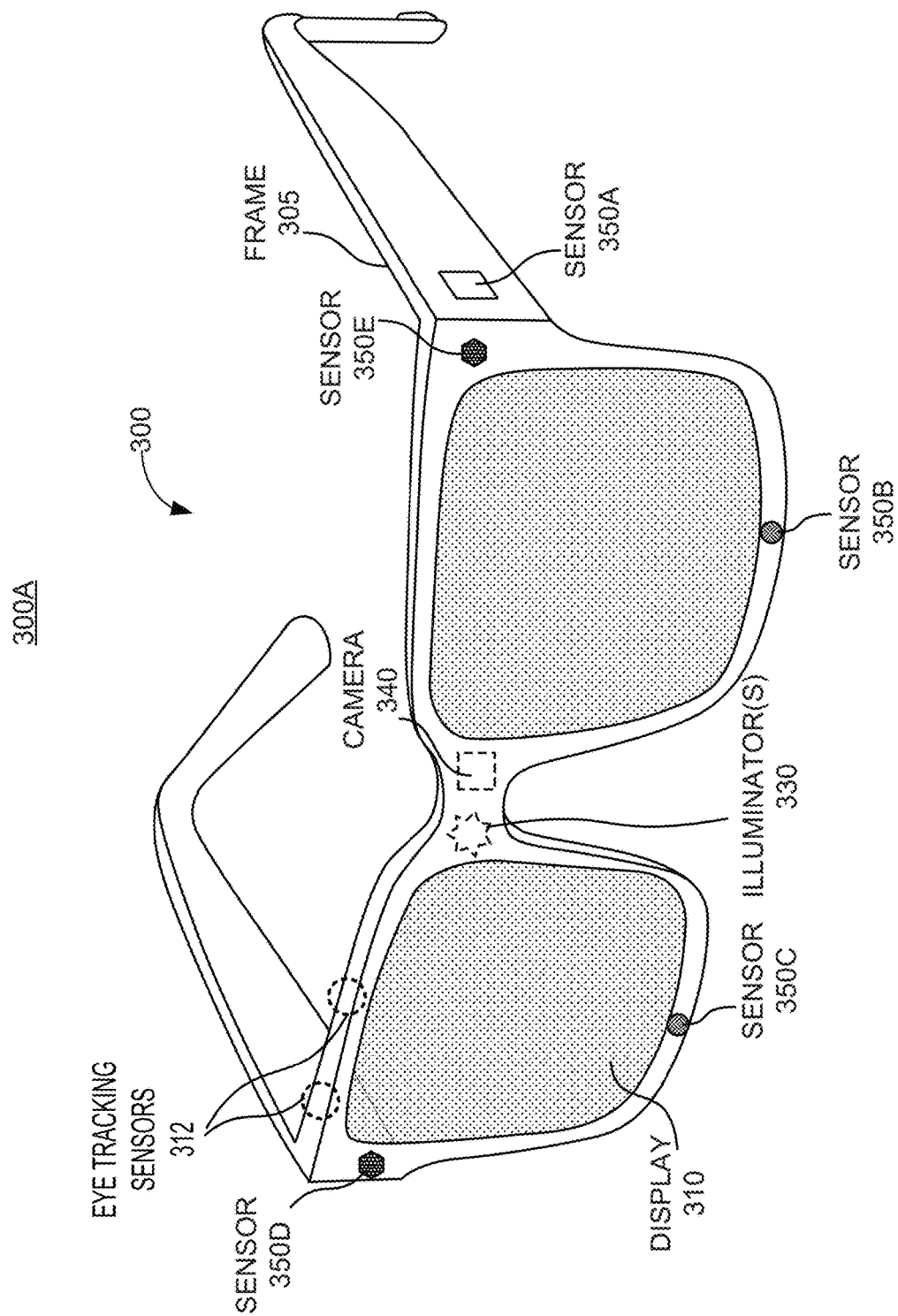
FIGS. 3A and 3B illustrate a perspective view and a top view of a near-eye display in the form of a pair of glasses, according to an example.

FIG. 3A is a perspective view 300A of a near-eye display 300 in the form of a pair of glasses (or other similar eyewear), according to an example. In some examples, the near-eye display 300 may be a specific example of near-eye display 120 of FIG. 1 and may be configured to operate as a virtual reality display, an augmented reality (AR) display, and/or a mixed reality (MR) display.

In some examples, the near-eye display 300 may include a frame 305 and a display 310. In some examples, the display 310 may be configured to present media or other content to a user. In some examples, the display 310 may include display electronics and/or display optics, similar to components described with respect to FIGS. 1-2. For example, as described above with respect to the near-eye display 120 of FIG. 1, the display 310 may include a liquid crystal display (LCD) display panel, a light-emitting diode (LED) display panel, or an optical display panel (e.g., a waveguide display assembly). In some examples, the display 310 may also include any number of optical components, such as waveguides, gratings, lenses, mirrors, etc. In other examples, the display 210 may include a projector, or in place of the display 310 the near-eye display 300 may include a projector.

In some examples, the near-eye display 300 may further include various sensors 350*a*, 350*b*, 350*c*, 350*d*, and 350*e* on or within a frame 305. In some examples, the various sensors 350*a*-350*e* may include any number of depth sensors, motion sensors, position sensors, inertial sensors, and/or ambient light sensors, as shown. In some examples, the various sensors 350*a*-350*e* may include any number of image sensors configured to generate image data representing different fields of views in one or more different directions. In some examples, the various sensors 350*a*-350*e* may be used as input devices to control or influence the displayed content of the near-eye display, and/or to provide an interactive virtual reality (VR), augmented reality (AR), and/or mixed reality (MR) experience to a user of the near-eye display 300. In some examples, the various sensors 350*a*-350*e* may also be used for stereoscopic imaging or other similar application.

In some examples, the near-eye display 300 may further include one or more illuminators 330 to project light into a physical environment. The projected light may be associated with different frequency bands (e.g., visible light, infra-red light, ultra-violet light, etc.), and may serve various purposes. In some examples, the one or more illuminator(s) 330 may be used as locators, such as the one or more locators 126 described above with respect to FIGS. 1-2.

In some examples, the near-eye display 300 may also include a camera 340 or other image capture unit. The camera 340, for instance, may capture images of the physical environment in the field of view. In some instances, the captured images may be processed, for example, by a virtual reality engine (e.g., the virtual reality engine 116 of FIG. 1) to add virtual objects to the captured images or modify physical objects in the captured images, and the processed images may be displayed to the user by the display 310 for augmented reality (AR) and/or mixed reality (MR) applications. The near-eye display 300 may also include eye tracking sensors 312.

Figure 3B:
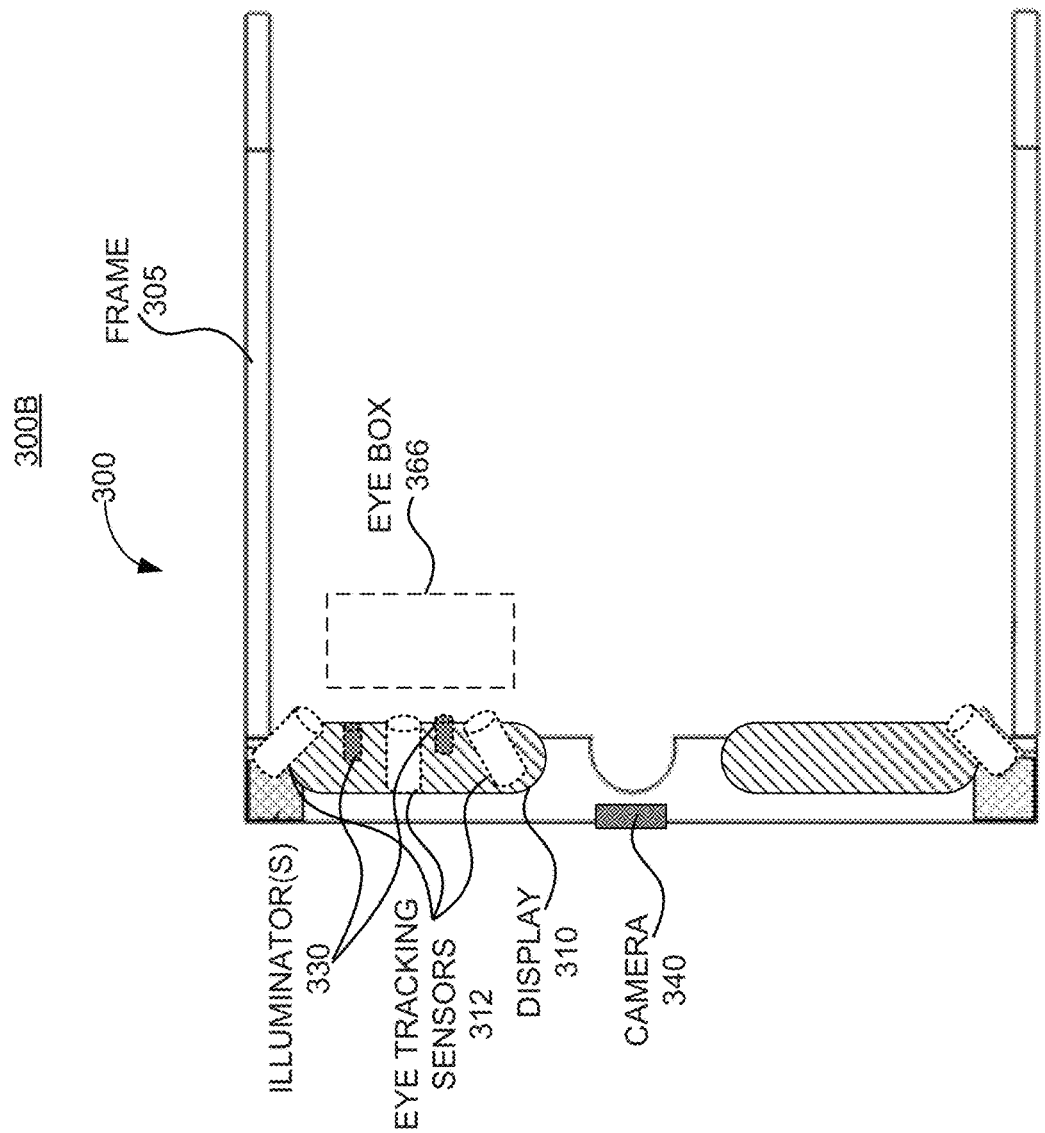

FIG. 3B is a top view 300B of a near-eye display 300 in the form of a pair of glasses (or other similar eyewear), according to an example. In some examples, the near-eye display 300 may include a frame 305 having a form factor of a pair of eyeglasses. The frame 305 supports, for each eye: a fringe projector 314 such as any fringe projector variant considered herein, a display 310 to present content to an eye box 366, eye tracking sensors 312, and one or more illuminators 330. The illuminators 330 may be used for illuminating an eye box 366, as well as, for providing glint illumination to the eye. A fringe projector 314 may provide a periodic fringe pattern onto a user's eye. The display 310 may include a pupil-replicating waveguide to receive the fan of light beams and provide multiple laterally offset parallel copies of each beam of the fan of light beams, thereby extending a projected image over the eye box 366.

In some examples, the pupil-replicating waveguide may be transparent or translucent to enable the user to view the outside world together with the images projected into each eye and superimposed with the outside world view. The images projected into each eye may include objects disposed with a simulated parallax, so as to appear immersed into the real-world view.

The eye tracking sensors 312 may be used to determine position and/or orientation of both eyes of the user. Once the position and orientation of the user's eyes are known, a gaze convergence distance and direction may be determined. In some examples, the eye tracking sensors 312 may be single photon avalanche diode (SPAD) sensors. The imagery displayed by the display 310 may be adjusted dynamically to account for the user's gaze, for a better fidelity of immersion of the user into the displayed augmented reality scenery, and/or to provide specific functions of interaction with the augmented reality. In operation, the illuminators 330 may illuminate the eyes at the corresponding eye boxes 366, to enable the eye tracking cameras to obtain the images of the eyes, as well as to provide reference reflections. The reflections (also referred to as "glints") may function as reference points in the captured eye image, facilitating the eye gazing direction determination by determining position of the eye pupil images relative to the glints. To avoid distracting the user with illuminating light, the latter may be made invisible to the user. For example, infrared light may be used to illuminate the eye boxes 366.

In some examples, the image processing and eye position/orientation determination functions may be performed by a central controller, not shown, of the near-eye display 300. The central controller may also provide control signals to the display 310 to generate the images to be displayed to the user, depending on the determined eye positions, eye orientations, gaze directions, eyes vergence, etc.

Figure 4:
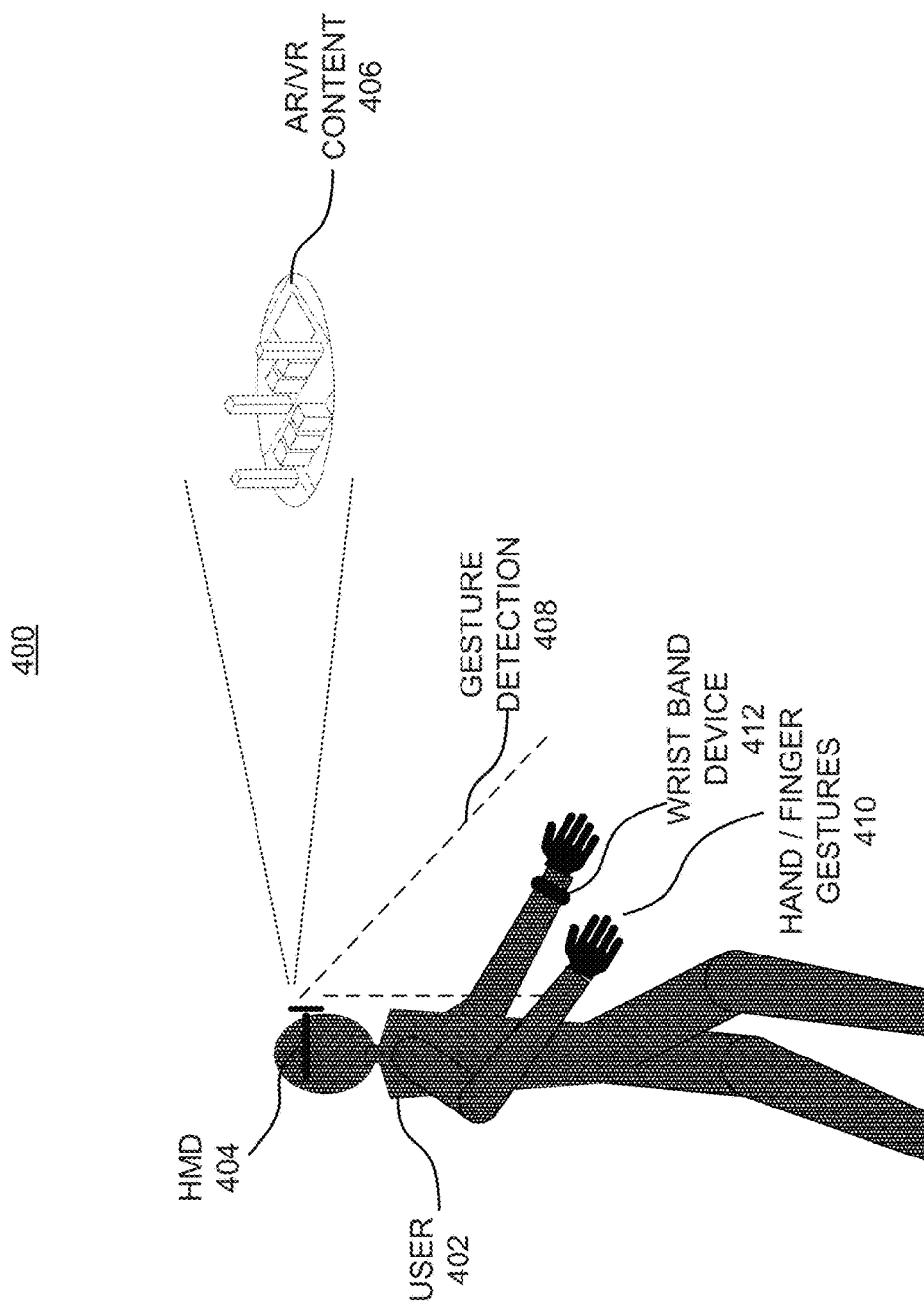
FIG. 4 illustrates control of interaction with displayed content in a near-eye display device based on eye tracking in conjunction with other inputs, according to examples.

FIG. 4 illustrates control of interaction with displayed content in a near-eye display device based on eye tracking in conjunction with other inputs, according to examples. Diagram 400 shows mixed reality (MR) content 406 such as augmented reality (AR), virtual reality (VR) being displayed to a user 402 through a near-eye display device 404 (e.g., a head-mounted display (HMD) device). The user 402 may interact with the displayed mixed reality (MR) content 406 through gaze detection in conjunction with secondary inputs such as gesture detection 408, which may detect hand and/or finger gestures 410, and input device feedback such as a wrist band device 412, among other things.

In some examples, interaction with the displayed mixed reality (MR) content 406 may include selection of a portion of the displayed mixed reality (MR) content 406, modifications on the selected portion such as rotation, zooming, panning, etc., and receiving information associated with the selected portion. For example, the displayed mixed reality (MR) content 406 may include a three-dimensional (3D) map. The user 402 may rotate, zoom, or pan various portions of the displayed map. Furthermore, tool tips or flags may be displayed at certain locations upon detection of the user's gaze focusing on those locations, considered as primary input. The user 402 may then select a menu item or similar action available from the tool tip or flag through a secondary input and the action may be performed. For example, the user's gaze may focus on a building on the map, a tool tip listing businesses in the building may be displayed upon detection of the focus of the user's gaze. The user may then select one of the listed businesses through secondary input (e.g., eye gesture, hand gesture, finger gesture, device input, body movement, etc.), and information associated with the selected business may be displayed. In some examples, a secondary tool tip (or menu) may be displayed providing the user with additional options such as calling the business, emailing the business, learning about business hours, etc., which may be activated through secondary input as well. The head-mounted display 404 (near-eye display device) may include an image sensor to capture hand, finger, eye gestures or body movements (arm, head, torso, leg, etc.). In some examples, the image sensor may be an inward facing camera to capture an eye gesture, or the camera may be an outward facing camera to capture a hand gesture, a finger gesture, or a body movement from a nearby reflective surface.

In other examples, further interactions may be enabled such as upon detection of the user's gaze focus on two different locations within a predefined period, navigation information between the two points may be displayed. As the user's gaze moves along the map, point of interest (POI) flags may be displayed allowing the user to select one of those and receive additional information.

Figure 5A:
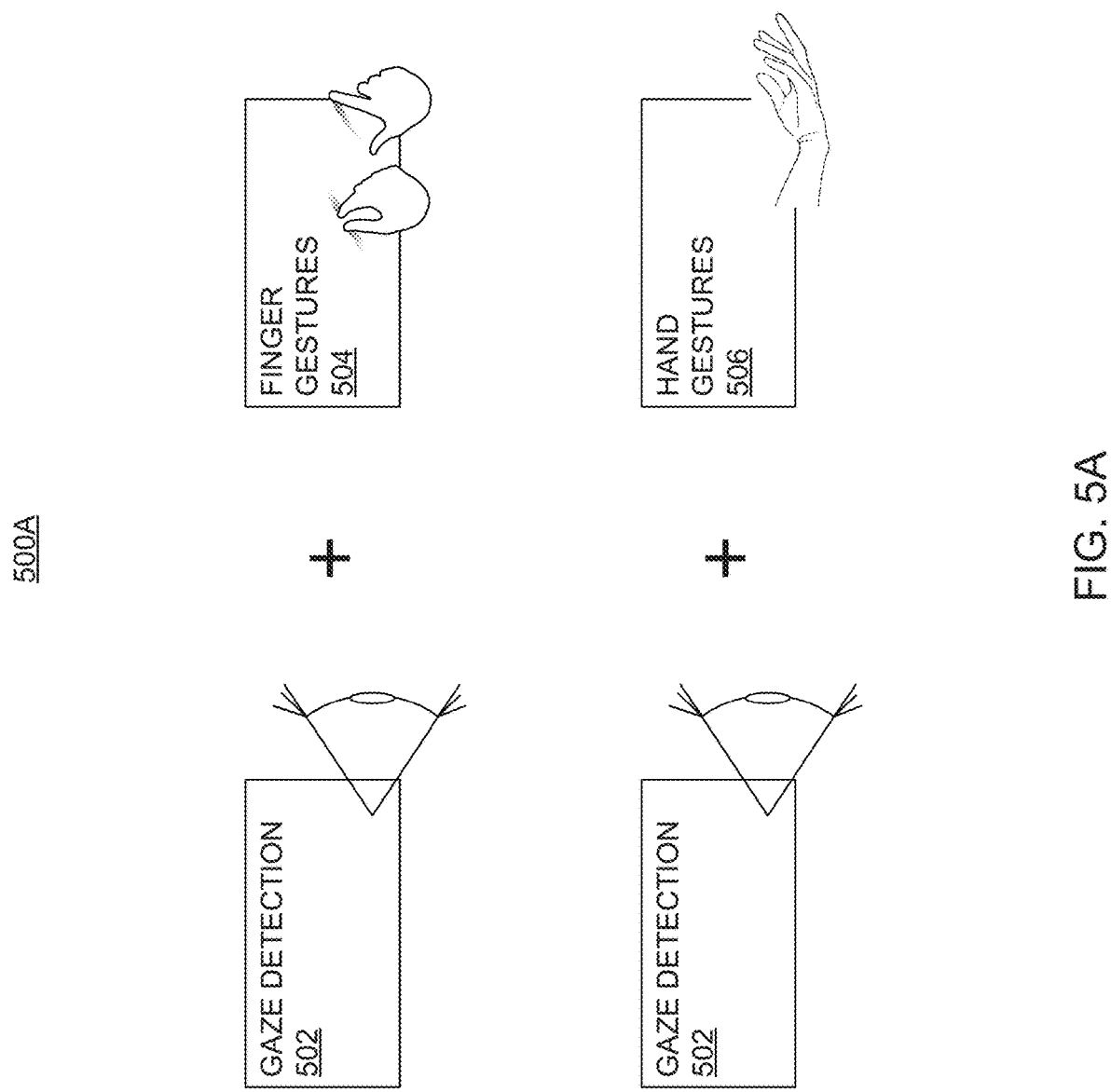
FIG. 5A illustrates control of interaction with displayed content based on eye tracking in conjunction with finger gestures or hand gestures, according to examples.

FIG. 5A illustrates control of interaction with displayed content based on eye tracking in conjunction with finger gestures or hand gestures, according to examples. Diagram 500A shows a combination of gaze detection 502 and finger gestures 504 and a combination of gaze detection 502 and hand gestures 506 to interact with displayed mixed reality (MR) content.

In some examples, determining the gaze of the user may be include determination of a fixation and/or saccades. During fixation, the eyes may stop scanning a scene and hold the foveal area of the field of vision in one place, which may be interpreted as a location of interest (LOI). As used herein, saccades may refer to eye movements that move the fovea rapidly from one fixation to another. Thus, based on a saccade and two fixations (movement of the gaze from one location of interest (LOI) to another), an action such as providing routing information on a map may already be performed. Other interactions may include the combinations. Once a location of interest (LOI) is identified (through fixation), a number of actions specific to that location may be available through secondary input. For example, the user may be enabled to zoom, rotate, pan, or move the location of interest through the finger gestures 504 and/or the hand gestures 506.

In some examples, the hand gestures 506 may include different positions of the hand (e.g., palm-up, palm-down), sideways or vertical movement of the hand, rotation of the hand, a first formation, open hand formation, etc. The finger gestures 504 may include tapping, tap-and-hold, dragging, pinching, spreading, flicking one or more fingers, sliding a finger, etc. Each of these gestures may be associated with a particular action (e.g., rotation, zoom, pan, activation of a tool tip, selection of a tool tip/menu item, etc.). As mentioned herein, the interaction may include multiple levels. For example, upon identification of the location of interest (based on the gaze), a first set of actions (associated with particular gestures) may be made available. Upon performance of one of those actions, a second set of actions associated with other gestures may be made available, etc.

Figure 5B:
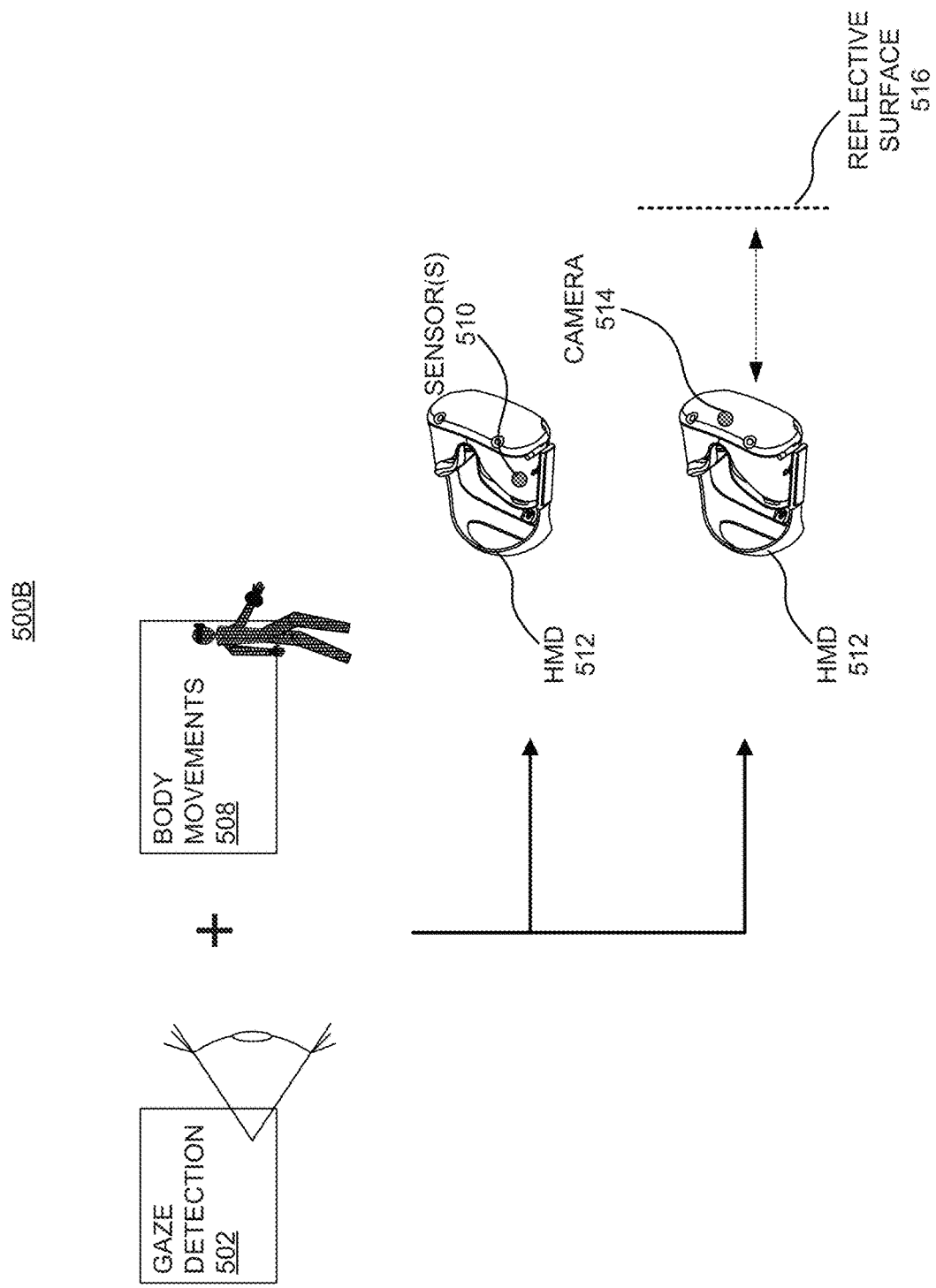
FIG. 5B illustrates control of interaction with displayed content based on eye tracking in conjunction with body movements, according to examples.

FIG. 5B illustrates control of interaction with displayed content based on eye tracking in conjunction with body movements, according to examples. Diagram 500B shows use of gaze detection 502 in combination with body movement detection 508. Body movements of the user may be detected through one or more sensors 510 (e.g., gyroscopes) integrated into a head-mounted device (HMD) 512 or through visual capture of the body movements from a nearby reflective surface 516 by a camera 514 on the head-mounted device (HMD) 512.

In some examples, the user's body movements such as nodding or shaking of the head, raising or other motions of the arms, movement of the torso in various directions, or even leg movements may correspond to various actions on the displayed mixed reality (MR) content. The body movements may be captured through a number of sensors such as gyroscopes on the head-mounted display (HMD) 512. The body movements may also be detected visually through an outward facing camera on the head-mounted display (HMD) 512. The camera 514 may capture the body movements from reflection on a reflective surface 516 such as a mirror, a window, or even another person's reflective glasses.

Figure 5C:
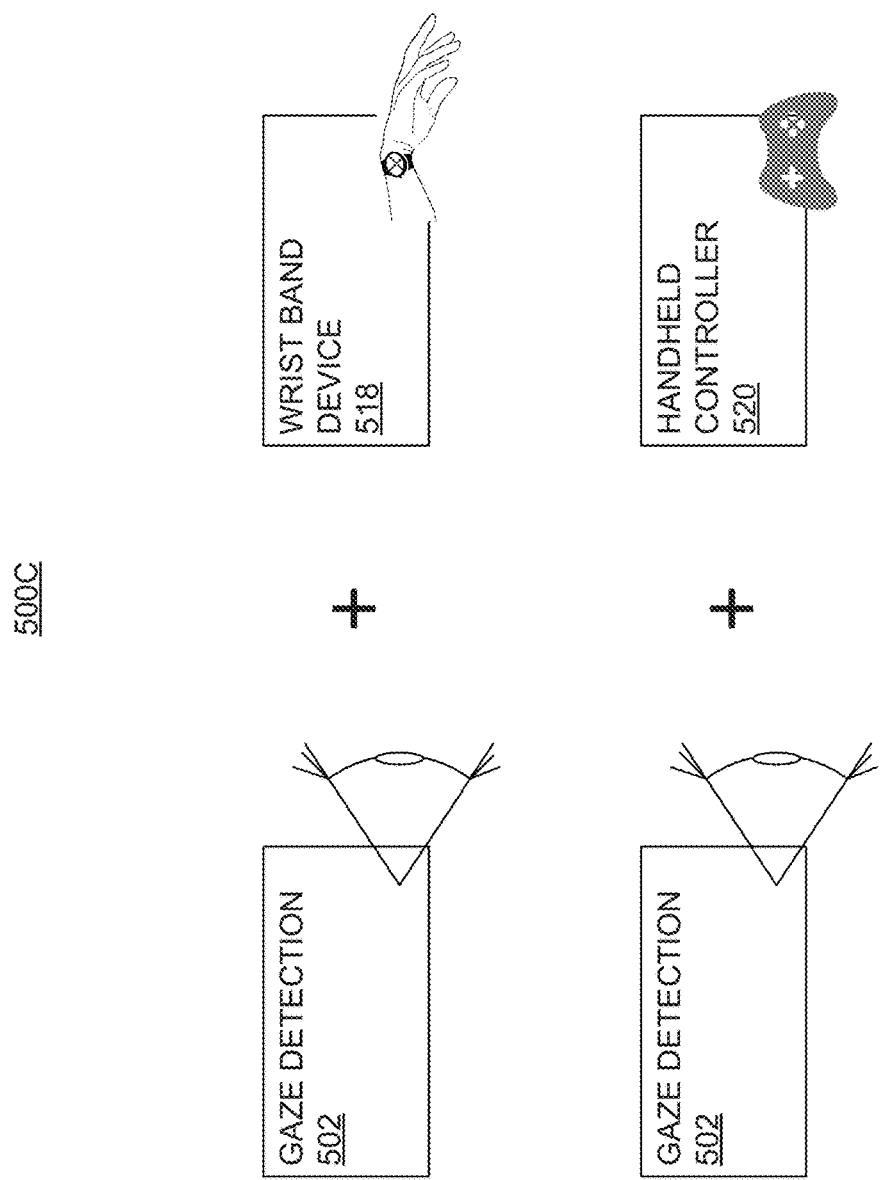
FIG. 5C illustrates control of interaction with displayed content based on eye tracking in conjunction with secondary device inputs, according to examples.

FIG. 5C illustrates control of interaction with displayed content based on eye tracking in conjunction with secondary device inputs, according to examples. Diagram 500C shows a combination of gaze detection 502 and wrist band device 518 input and a combination of gaze detection 502 and handheld controller 520 input to interact with displayed mixed reality (MR) content.

In some examples, the wrist band device 518 (e.g., a smart watch, a wrist band controller, etc.) may detect hand, arm, or even finger gestures through one or more sensors such as gyroscopes, electrical signal detectors, etc. and provide a detected gesture to the head-mounted display (HMD) 512 through wired or wireless means (e.g., near-field wireless communication). Similarly, a user may use a handheld controller 520 such as a game controller to provide the secondary input (e.g., by pressing buttons or scrolling wheels on the controller).

In some cases, a processor on the head-mounted display (HMD) 512 may receive gaze detection input and secondary input (e.g., through wireless means from a separate device or through gesture detection on the head-mounted display (HMD) 512) and allow the user to interact with the displayed content. In other cases, a processor on a separate device communicatively coupled to the head-mounted display (HMD) 512 (and a secondary device if that is the case) may receive the gaze detection and secondary inputs, interpret the action(s), and provide instructions to the head-mounted display (HMD) 512 to modify the displayed content based on the user action(s). Such a separate device may be a controller, a computer, a game console, or a smartphone, for example.

Figure 6:
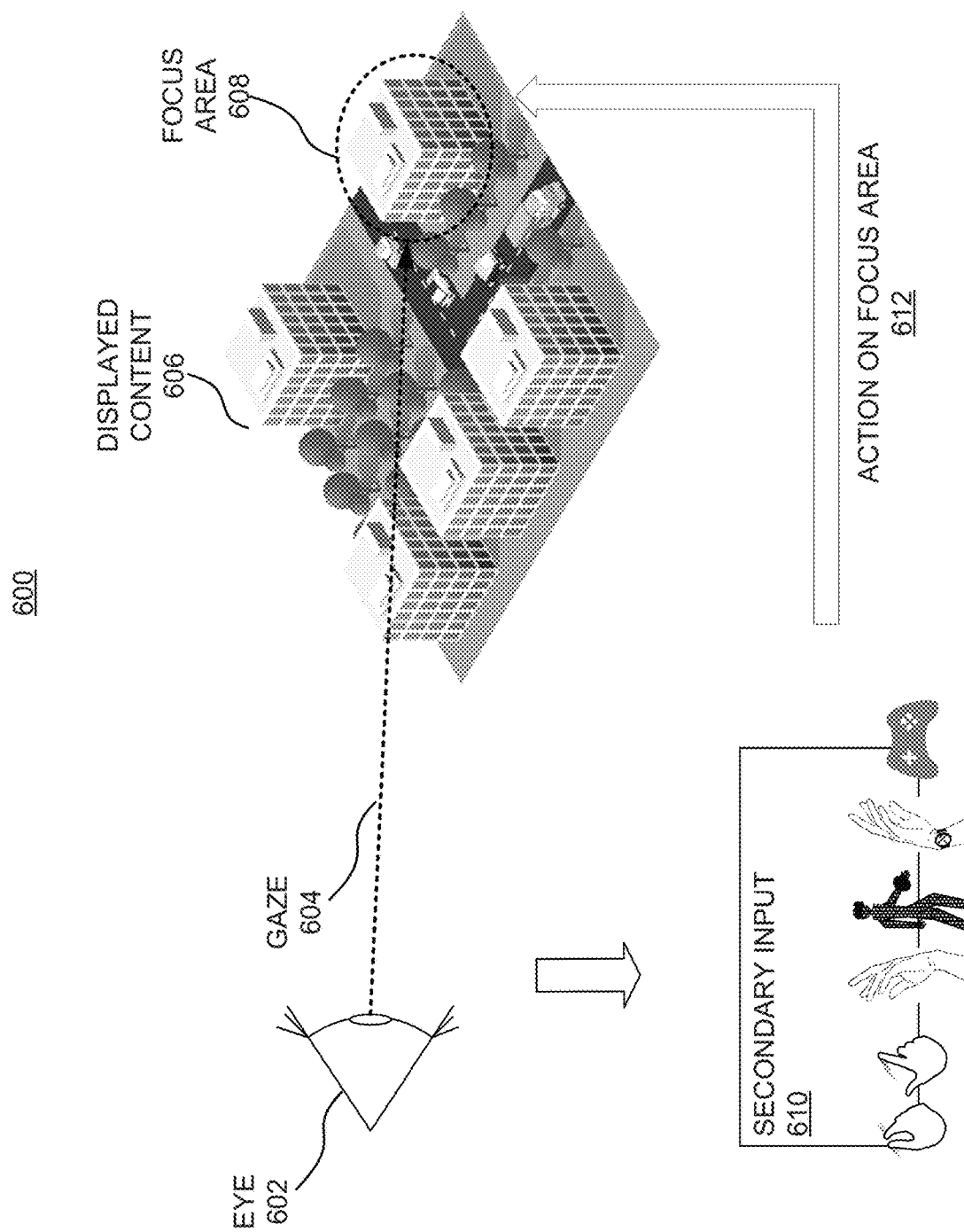
FIG. 6 illustrates control of interaction with displayed content such as a 3D interactive map based on gaze focus in conjunction with secondary inputs, according to examples.

FIG. 6 illustrates control of interaction with displayed content such as a 3D interactive map based on gaze focus in conjunction with secondary inputs, according to examples. Diagram 600 shows identification of a focus area 608 (location of interest (LOI)) on displayed content 606 (a 3D interactive map, for example) through detection of a gaze 604 of an eye 602 and performance of an action on the focus area (612) based on a secondary input 610.

In some examples, the displayed content may be a 3D interactive map as shown in the diagram 600. Displayed content is not limited to 3D or 2D maps, however. Any mixed reality (MR) content, that is augmented reality (AR) or virtual reality (VR) content may include any form of computer generated image(s) presented by themselves or superimposed on a real life image (e.g., scenery around the user). Depending on the type of displayed content (i.e., the type of computer generated content and/or the type of real-world content of the external environment around the user), available actions may be different. For example, point-of-interest (POI) information, routing information, zooming, rotating, and panning may be more common actions associated with map type content. On the other hand, moving, zooming, panning, and art-related information may be more common for a mixed reality (MR) content presenting artwork in a museum, for example. Yet another example may include display of goods on shelves with the user being allowed to move the goods, view from different angles, obtain information about them, and purchase them.

The gaze 604 of the eye 602 may be detected through any number of eye tracking techniques as discussed herein. Along with the gaze information about fixation and/or saccades may be obtained. Fixation is an eye movement, which may be used to make inferences about cognitive processes and attention. During a fixation, the eyes may stop scanning a scene and hold the foveal area of the user's field of vision in one place. Even though the eyes seem to be stationary during a fixation, there are always minute eye movements. However, these do not move the focus away from what is being looked at (location of interest) and are therefore considered to belong to the same fixation.

Fixations may last between 50 ms to 600 ms, and have a frequency of less than 3 Hz. Saccades are eye movements that move the fovea rapidly from one location of interest to another. Human perception is guided by sequences of fixations and saccades. Due to the fast movement during a saccade, the image on the retina may be of poor quality and information intake may thus happen mostly during the fixation period. Saccades may be triggered voluntarily or involuntarily. During the saccades, both eyes move in the same direction. Latency if saccades may be task dependent and vary between 100 ms and 1000 ms. An average duration of a saccade may be between 20 ms and 40 ms. A duration of a saccade and its amplitude have a linear relationship (i.e., longer saccades take more time). An end point of a saccade may not be changed once the eye has started moving. Saccades may not always have simple linear trajectories.

Accordingly, fixations and saccades may be used to identify locations of interest, followed by secondary inputs to perform actions associated with the identified locations of interest. In some examples, other eye movements such as vergence movements, which align the fovea of each eye with targets located at different distances from the observer, or vestibulo-ocular movements, which stabilize the eyes relative to the external world thus compensating for head movements, may also be used.

The secondary inputs, as discussed herein, may include, but are not limited to, finger gestures, hand gestures, body movements, wrist band device inputs, handheld controller inputs, and/or eye gestures. In an example scenario, the user's gaze may indicate a building on an interactive map as the location of interest. Actions associated with the building such as zooming, rotating, providing information about businesses in the building, etc. may be tied to eye gestures such as blinking, up-and-down eye movements, side-to-side eye movements, etc. Of course, any of the other input types (gestures, device inputs, etc.) may also be used as secondary input.

Figure 7:
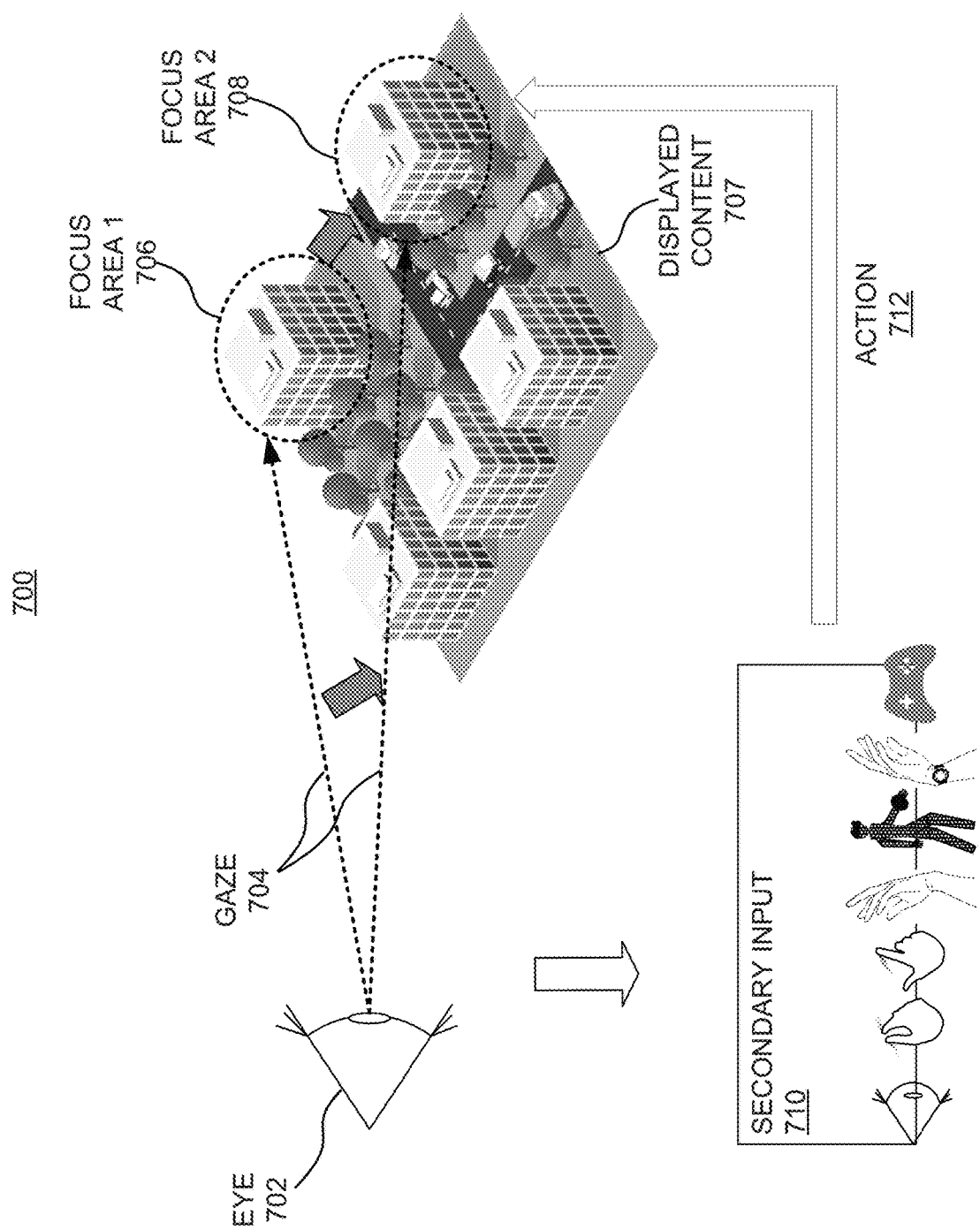
FIG. 7 illustrates control of interaction with displayed content such as a 3D interactive map based on fixations and saccades in conjunction with secondary inputs, according to examples.

FIG. 7 illustrates control of interaction with displayed content such as a 3D interactive map based on fixations and saccades in conjunction with secondary inputs, according to examples. Diagram 700 shows identification of a first focus area 706 and a second focus area 708 (locations of interest) on displayed content 707 (a 3D interactive map, for example) through detection of a gaze 704 of an eye 702 and performance of an action 712 based on the identified focus areas and a secondary input 710.

In some examples, interactivity may be provided based on identification of more than one location of interest. For example, identification of the first focus area 706 and the second focus area 708 may be interpreted as the user being interested in a route between the two locations of interest. Thus, the secondary inputs (eye, finger, hand gestures; body movements; or device inputs) may be associated with providing a route and information associated with the route. For example, one or more possible routes may be displayed upon detection of the two locations of interest and the secondary input(s) used to select among the possible routes. A tool tip may be displayed, and secondary inputs may be used to select among the information included in the tool tip. Other actions may include rotation, zooming, or panning on the map to bring the route to the forefront or remove other areas.

Figure 8:
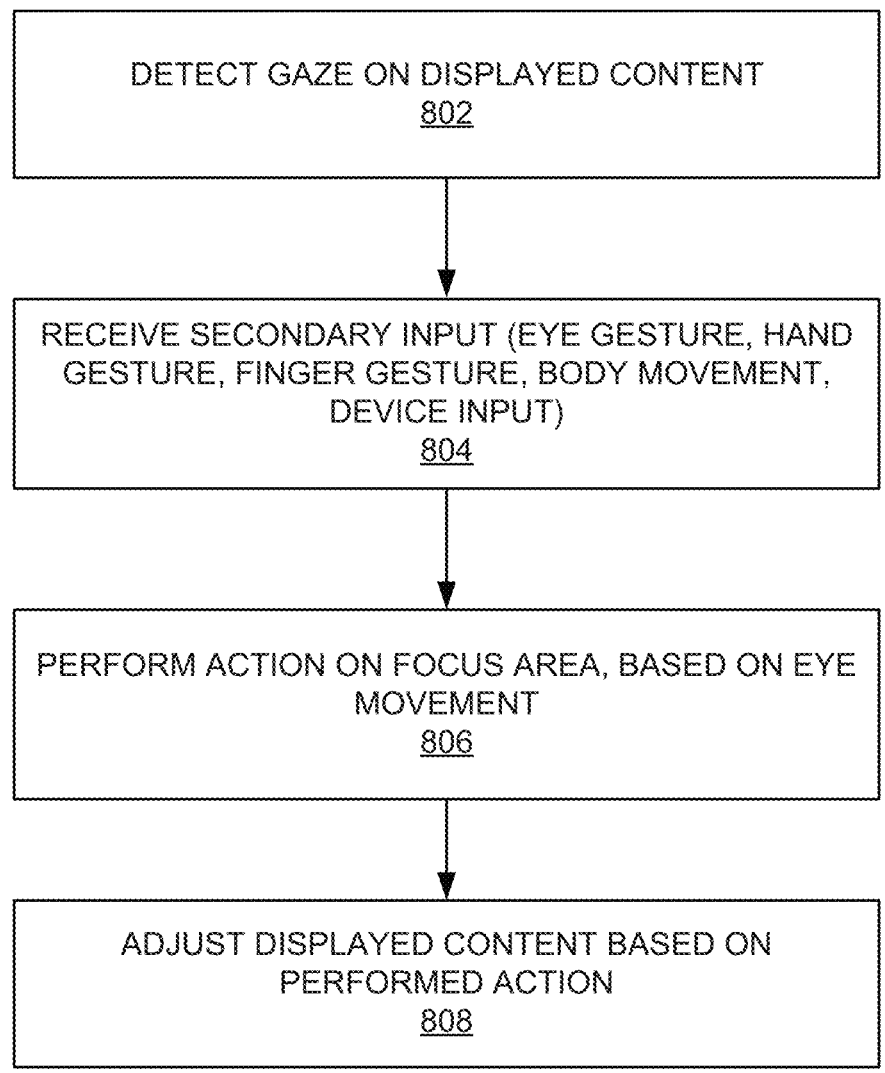
FIG. 8 illustrates a flow diagram for a method of controlling interaction with displayed content based on eye tracking in conjunction with secondary inputs, according to some examples.

In some examples, the user may pan outside a visible extent of the displayed content (e.g., 3D maps). Pins, flags, or comparable indicators may illustrate points-of-interest (POIs) on or outside of the visible map area. Routes may also be provided from a user location to a POI (or location of interest (LOI)). Different views such as a list view or a matrix view may be toggled FIG. 8 illustrates a flow diagram for a method of controlling interaction with displayed content based on eye tracking in conjunction with secondary inputs, according to some examples. The method 800 is provided by way of example, as there may be a variety of ways to carry out the method described herein. Although the method 800 is primarily described as being performed by the components of FIGS. 2-3B, the method 800 may be executed or otherwise performed by one or more processing components of another system or a combination of systems. Each block shown in FIG. 8 may further represent one or more processes, methods, or subroutines, and one or more of the blocks (e.g., the selection process) may include machine readable instructions stored on a non-transitory computer readable medium and executed by a processor or other type of processing circuit to perform one or more operations described herein.

At block 802, gaze of the user in relation to displayed content may be determined by eye tracking as primary input. The gaze information may include fixation and/or saccades and identify one or more locations of interest on the displayed content. In some examples, the gaze information may provide two or more locations of interest, which may be used to provide route information and actions associated with a route on a displayed 2D or 3D map, for example. In case of single location of interest, a variety of actions at one or more levels may be made available depending on the type of location of interest.

At block 804, secondary input associated with one or more of the available actions (based on the gaze information) may be received. The secondary input may include, but is not limited to, eye gesture, hand gesture, finger gesture, body movement, a wrist band device input, a handheld controller input, or similar ones. In some examples, the system may automatically select a modality of the secondary input, while in other examples, the user may be enabled to select the modality.

At block 806, an action may be performed on displayed content in conjunction with the determined location of interest and based on the secondary input. For example, finger gestures may be used to rotate, zoom, or pan a portion of a displayed map. Eye gestures (blinking, up-and-down movements, side-to-side movements, etc.) may also be used as secondary input on the location of interest. For example, a tool tip associated with a location of interest may include a list of actions. The user may scroll up and down the list using up-and-down eye movements and blinking to select one of the actions on the list.

At block 808, the displayed content may be adjusted based on the performed action. For example, a portion (or the whole) display content may be rotated, zoomed, or panned. Upon completion of the adjustment of the displayed content, new actions may be made available to the user to provide secondary input and/or the user's gaze may be tracked to determine if the location of interest changed.

According to examples, a method of making a near-eye display device to provide interactivity with displayed content based on eye tracking in conjunction with secondary inputs is described herein. A system of making the near-eye display device is also described herein. A non-transitory computer-readable storage medium may have an executable stored thereon, which when executed instructs a processor to perform the methods described herein.

In the foregoing description, various examples are described, including devices, systems, methods, and the like. For the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples.

The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example' is not necessarily to be construed as preferred or advantageous over other embodiments or designs.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A head mounted display (HMD) device system for presenting mixed reality (MR) interactive content, comprising:
   a display system to project a three-dimensional (3D) interactive environment to a user wearing the HMD device;
   an eye tracking system to determine a gaze of the user and information regarding at least one fixation and at least one saccade of an eye of the user;
   a sensor system to sense a body movement of the user corresponding to an action to be taken within the projected 3D interactive environment; and
   a controller communicatively coupled to the display system, the eye tracking system, and the sensor system, the controller to:
      identify a 3D point of interest (POI) of the user within the projected 3D interactive environment based on the determined gaze of the user and information regarding at least one fixation and at least one saccade of the eye of the user;
      identify the action to be taken on the identified 3D POI within the projected 3D interactive environment based on the sensed body movement and the identified 3D POI; and
      control the display system to adjust the projected 3D interactive environment to show the action being taken on the identified 3D POI.

2. The HMD device system of claim 1, wherein the 3D interactive environment is projected upon a view of an external environment of the HMD display system such that the 3D interactive environment appears immersed into a real-world view of the user.

3. The HMD device system of claim 2, wherein the user may identify, via the eye tracking system, a real-world 3D POI from the external environment and identify, via the sensor system, an action to be taken on the identified real-world 3D POI.

4. The HMD device system of claim 3, wherein a plurality of available actions depends on a type of the identified 3D POI in the 3D interactive environment or a type of the identified real-world 3D POI in the external environment.

5. The HMD device system of claim 1, wherein the action being taken on the identified 3D POI comprises showing information about the identified 3D POI.

6. The HMD device system of claim 1, wherein the action being taken on the identified 3D POI comprises showing a menu of available actions associated with the identified 3D POI.

7. The HMD device system of claim 6, wherein a plurality of levels of menus of available actions associated with the identified 3D POI may be shown to the user.

8. The HMD device system of claim 1, wherein the 3D interactive environment comprises an interactive 3D map, and the 3D POI comprises a 3D location of interest (LOI) in the interactive 3D map.

9. The HMD device system of claim 8, wherein the 3D LOI comprises a first 3D LOI, wherein the user may identify, via the eye tracking system, a second 3D LOI in the interactive 3D map, and wherein the action being taken comprises showing at least one route between the first 3D LOI and the second 3D LOI in the interactive 3D map.

10. The HMD device system of claim 1, wherein the sensor system comprises at least one of a wrist band device or a handheld controller.

11. A head mounted display (HMD) device system for presenting mixed reality (MR) interactive content, comprising:
   at least one outward-facing camera to take images of an external environment;
   a display system to project a combination of a three-dimensional (3D) interactive environment and images of the external environment to a user wearing the HMD device;
   an eye tracking system to determine a gaze of the user and information regarding at least one fixation and at least one saccade of an eye of the user;
   a sensor system to sense a body movement of the user; and
   a controller communicatively coupled to the at least one outward-facing camera, the display system, the eye tracking system, and the sensor system, the controller to:
      identify a point of interest (POI) of the user within the projected combination of the 3D interactive environment and the images of the external environment based on the determined gaze of the user and information regarding at least one fixation and at least one saccade of the eye of the user;
      identify an action to be taken on the identified POI based on the sensed body movement and the identified POI; and
      control the display system to adjust the projected combination of the 3D interactive environment and the images of the external environment to show the action being taken on the identified POI.

12. The HMD device system of claim 11, wherein the controller is further to:
  control the display system to show information about the identified POI.

13. The HMD device system of claim 11, wherein the controller is further to:
  control the display system to show a menu of available actions associated with the identified POI.

14. The HMD device system of claim 13, wherein the controller is further to:
  control the display system to show a plurality of levels of menus of available actions associated with the identified POI.

15. The HMD device system of claim 11, wherein the identified POI comprises an identified location of interest (LOI), and wherein the controller is further to:
  control the display system to show at least one of a tool tip or a flag in the identified LOI.

* * * * *